(12) United States Patent
Moroney et al.

(10) Patent No.: US 8,936,279 B1
(45) Date of Patent: Jan. 20, 2015

(54) CUSTOMIZED ADVERTISING IN PRINT PRODUCTS AND OTHER PRODUCTS

(75) Inventors: Nathan M. Moroney, Palo Alto, CA (US); Ehud Chatow, Palo Alto, CA (US); Andrew Fitzhugh, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2371 days.

(21) Appl. No.: 11/460,488

(22) Filed: Jul. 27, 2006

(51) Int. Cl.
*B42D 15/00* (2006.01)
*B42D 15/10* (2006.01)
*G09C 3/00* (2006.01)

(52) U.S. Cl.
USPC .................. 283/56; 283/67; 283/70; 283/72; 283/74

(58) Field of Classification Search
USPC ................ 369/15, 84, 85; 375/219, 220, 240; 428/64.1, 64.4; 283/56, 67, 70, 72, 74

IPC ............ G07F 17/00,17/16, 17/30; G11B 27/11, G11B 27/34

See application file for complete search history.

(56) References Cited

U.S. PATENT DOCUMENTS

| | | | | |
|---|---|---|---|---|
| 5,974,004 A | * | 10/1999 | Dockes et al. | 715/727 |
| 6,654,547 B1 | * | 11/2003 | Maeda et al. | 386/125 |

* cited by examiner

*Primary Examiner* — Shelley Self
*Assistant Examiner* — Justin V Lewis

(57) ABSTRACT

Advertisements in instances of a product are customized prior to distributing the instances to different recipients. Information about the different recipients is received, and information about vendor interest with respect to advertising in the product is received. Customized advertisements are generated for each instance of the product. The customized advertisements in each instance reflect a convergence of the vendor interest and the recipient information. The convergence occurs before the instances are created. As a result, advertising in different instances is customized for the different recipients.

20 Claims, 3 Drawing Sheets

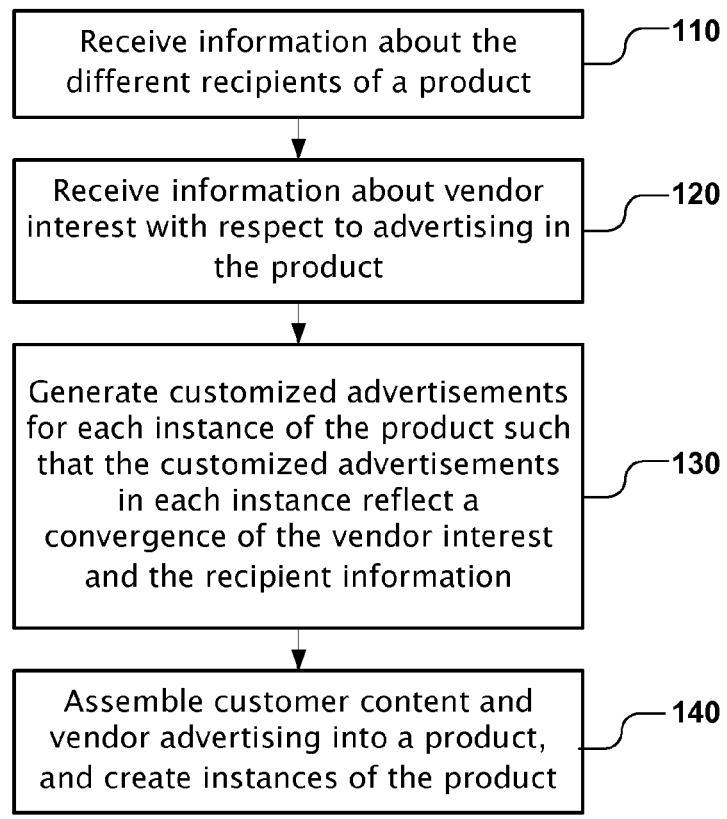
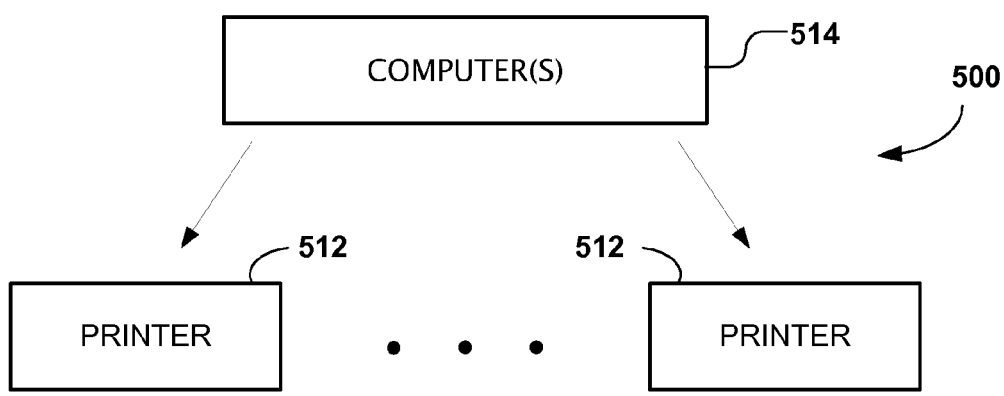

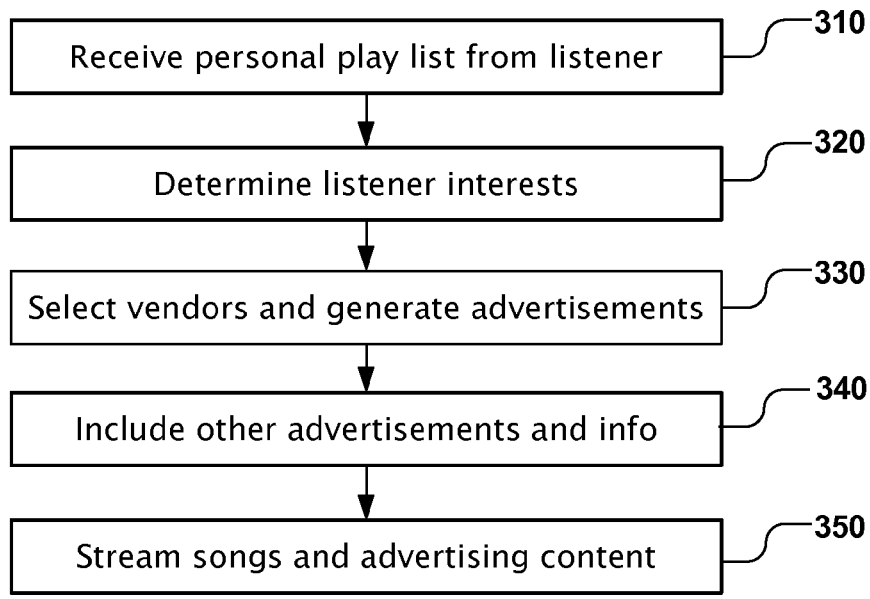
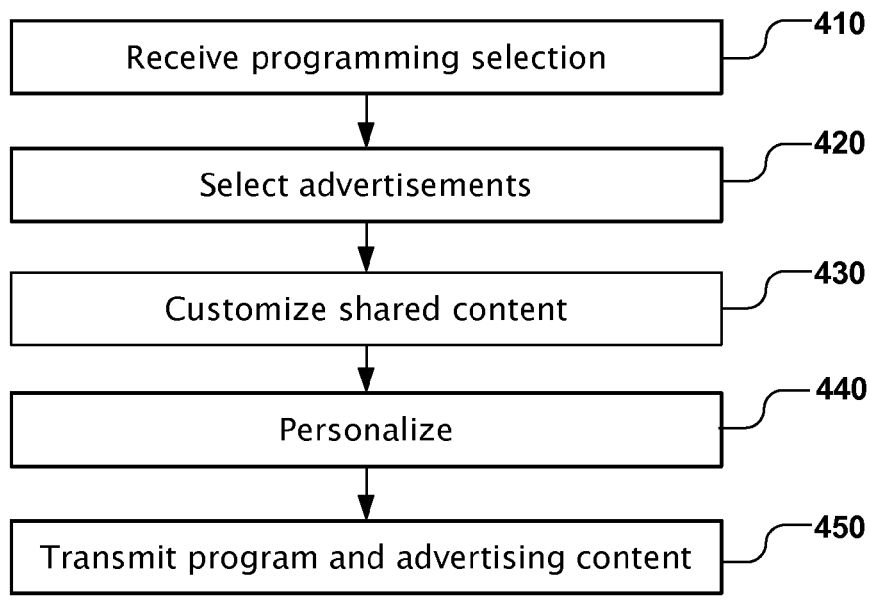

CUSTOMIZED ADVERTISING IN PRINT PRODUCTS AND OTHER PRODUCTS

BACKGROUND

The Internet has improved the efficiency of advertising. Costs are usually lower, and customer targeting is generally better than advertising via traditional media such as billboards and printed publications.

Internet advertising models such as "cost-per-click" and "cost-per-action" can be used to target potential customers and gauge their exposure to advertisements. In cost-per-click and cost-per-action models, web sites display clickable links from advertisers. Each time a user clicks on an advertiser's link, the advertiser pays an advertising network, which in turn pays the publisher a share of the payment. In cost-per-action models, payment is based solely on qualifying actions such as sales or registrations.

Cost per thousand impressions (CPM) is another Internet advertising model. CPM is used by Internet marketers to price ad banners. Sites that sell advertising will guarantee an advertiser a certain number of impressions (number of times an ad banner is downloaded and presumably seen by visitors), and then set a rate based on that guarantee times a CPM rate.

These models allow companies to gauge their exposure to potential customers. Metrics can be generated from the number of times an ad is clicked.

Although these models focus on quantity (the number of clicks, number of transactions, number of downloads), they do not account for the effectiveness of specific advertisements (e.g., whether a color ad is more effective than a black/white ad), nor do they account for the quality of targeted customers (e.g., a disinterested party versus a high-value customer).

BRIEF DESCRIPTION OF THE DRAWINGS

FIG. 1 is an illustration of a method in accordance with an embodiment of the present invention.

FIG. 3 is an illustration of a method in accordance with an embodiment of the present invention.

FIG. 4 is an illustration of a method in accordance with an embodiment of the present invention.

FIG. 5 is an illustration of a system in accordance with an embodiment of the present invention.

DETAILED DESCRIPTION

Figure 2:
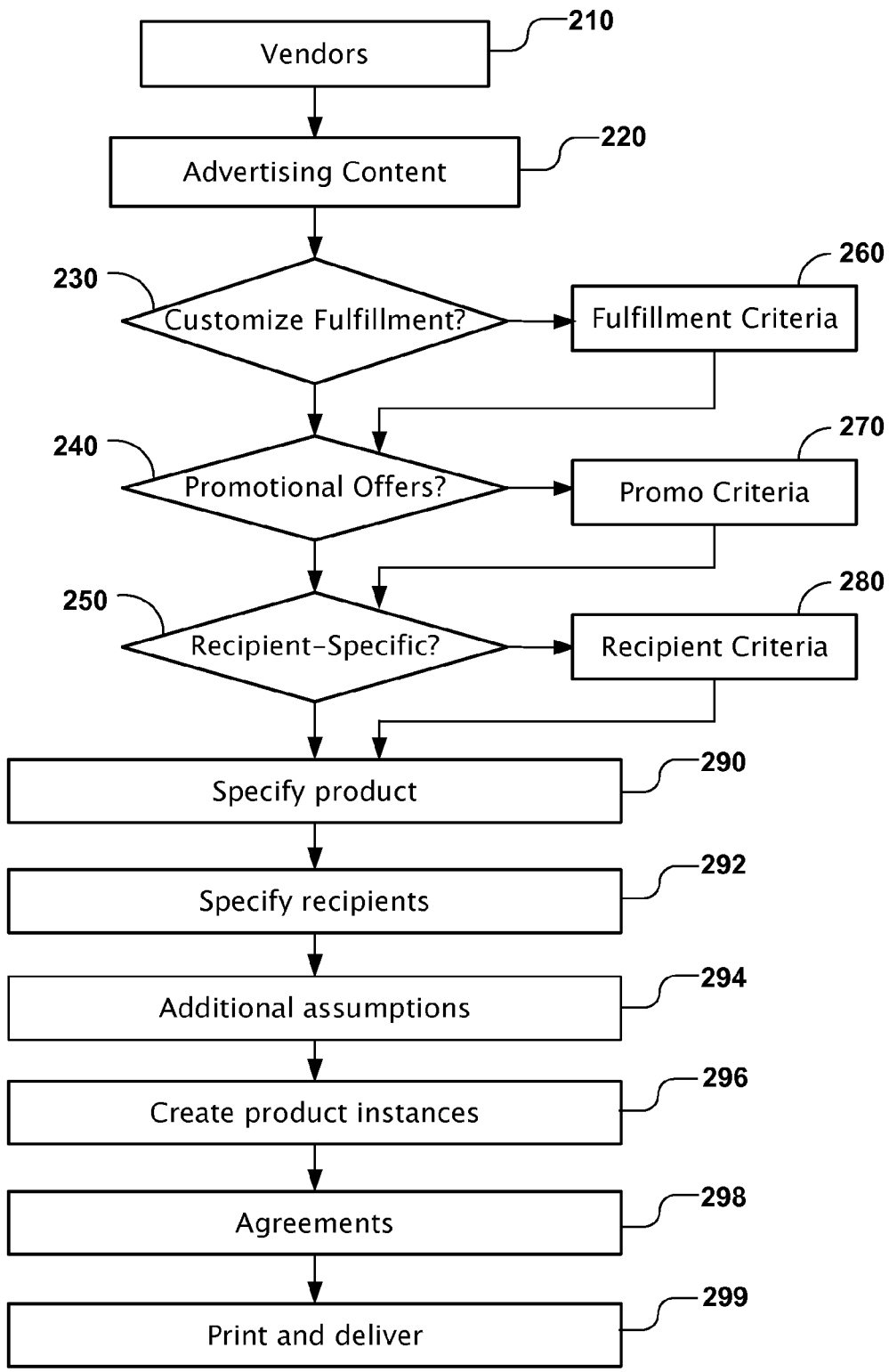
FIG. 2 is an illustration of a method in accordance with an embodiment of the present invention.

As shown in the drawings for purposes of illustration, the present invention is embodied in a model for advertising in print products and other products. Examples of print products include, without limitation, photo albums, newspapers, journals, catalogs, pamphlets, travel guides, post cards, signage, product packaging and books. Examples of other products include, without limitations, audio files, multimedia files, and software. The model is especially useful for advertising in products that are received by a large number of recipients having diverse interests.

Reference is made to FIG. 1, which illustrates an embodiment of a method of advertising. Advertisements in instances of a product are customized prior to distributing the instances to different "recipients."

Each recipient may be an individual person. However, a recipient is not so limited. As used herein, a recipient may be a group of people, such as people having a common interest or a set of common interests. For example, a recipient could be a group of people in the same profession (e.g., editors, engineers), people in a social club, students and alumni, subscribers to a newsletter or other publication, employees, a customer base, a religious group, a travel group, members of a family, etc.

Information about the product may be known in advance. The manner in which the information is known will depend upon the product. A customer (e.g., a recipient, a third party) could supply information expressing interest in a product. As examples, a customer makes a request for information about a product, a customer supplies photos or other material for processing into a photo album, a customer submits a purchase order for a product; a customer signs up for a newsletter, a customer requests an RSS feed, a customer generates a search engine query or text message query, a customer visits a web site, and a customer accesses a customized home page or other network event.

In addition or in the alternative, the information could be elicited from a customer. As an example, a query could be sent to a customer.

At block 110, information about the different recipients is received. The information might include geographic location, reading interests, hobbies, affiliations, memberships, desired level of advertising, etc.

The information about the different recipients may also include a preferred level of advertising. For example, a recipient might want to receive a product that contains no advertising. A recipient might be willing to pay full cost for such a product. Instead, the recipient might accept a certain amount of advertising in a product, but the product would be subsidized in part by advertisements. Thus, the recipient's cost of the product would be reduced.

The recipient information could be provided directly by the recipients. The information can also be obtained indirectly. For example, if digital images are provided, image tags will have information about the model of the camera that produces the images. This information can be used to identify recipient interests. Customized product instances, such as a cookbook or personal travel guide might include varying amounts of customer content which can then, in turn, be used to match to vendor interests.

The recipient information could be obtained by searching data. Public databases and private databases (e.g., CRMS) could be searched.

The recipient information could be obtained before, while, or after the product information is obtained. For example, a third party (customer) requests a photo album (the product) to be made from a series of digital images. The third party also supplies information about each intended recipient of the album. The recipient information could be supplied (in full or in part) with the request, with the digital images, or after the digital images have been submitted.

At block 120, information about vendor interest with respect to advertising in the product is received. The information may include advertising content. Examples of the advertising content include, without limitation, advertisements and promotional items such as coupons and special offers.

The advertising content could also include customer-specific information (e.g., promotional codes) that allows the vendors to gauge the specific value of their advertising investment. With unique custom printed advertisements for each product instance it should be possible to determine response rates with a high degree of accuracy.

The advertising content could be selected in any number of ways. One way is to perform a search on a proprietary database that associates vendors and their products with customer request. The database could be built from prior dealings with customers, by having vendors sign up with a service.

Another way is through contextual searches. Vendors could supply information in advance about customer profiles. For example the vendors could target recipients in given zip codes close to their stores or with desired characteristics. Vendor content could be selected by matching recipients with profiles.

Requests to advertise could be sent to select vendors or the requests could be sent to vendors without discrimination. Vendors could be selected from context of the customer information.

The information about vendor interest may also include information about how the vendor would like the advertisements to be displayed. That is, once the vendor advertisements have been supplied, the vendors may be asked how they want the advertisements displayed in the product instances. Examples of this vendor-supplied information include, without limitation, desired print quality, size, color, special surface treatment (e.g., gloss overcoat), number of impressions, placement of advertisements, etc.

The information about vendor interest is not limited to advertising content and advertising preferences. The information about vendor interest may also include other information such as budget, marketing objectives, target groups, etc. Consider, for example, a vendor of digital camera removable memory cards. The vendor might want to advertise only to those customers of online photofinishing when digital images include camera model tags that are compatible with their memory cards and not advertise to those customers whose images include camera model tags that are not compatible with their memory cards. Or consider a vendor who sells retirement services. In a university newsletter, the vendors might want to only advertise to those alumni approaching retirement age.

At block 130, customized advertisements are generated for each instance of the product. The customized advertisements in each instance reflect a convergence of the vendor interest and the recipient information. The convergence occurs before the instance is created. As a result, advertising in different instances is customized for the different recipients.

Chances are, different recipients will have different interests. Advertising value is not maximized if an advertiser boldly displays an advertisement that is of little interest to a recipient. Instead, advertising value is maximized by tailoring each advertisement (e.g., content, prominence) to each recipient.

The convergence allows for more efficient targeting of customers (e.g., ads are not sent to customers who are likely to ignore them), and better feedback on customer quality (customer-specific information links customers with specific ads). Advertisements can be targeted to specific types of content, relative amounts of personal, shared and professional content, specific recipient characteristics, and other specific characteristics.

The ability to customize the advertisements for each product instance to a specific recipient allows advertisers to generate metrics that describe customer quality, not just customer quantity. Further, this ability improves the efficiency of the advertisement format: the advertiser gets feedback as to the advertising display format that is most effective (e.g., size of ad, color or b/w, print quality).

Metrics for customer quantity are also improved. With unique custom printed advertisements for each micro-publication it should be possible to determine response rates with a high degree of accuracy.

At block 140, customer content and vendor advertising are assembled into a product, and instances of the product are created. The customer content could be provided only by a customer or only by a third party, or it could be a mix of customer content and third-party content. Third party content could be obtained directly from a third party, from the public domain via a search, for example.

The third party content might include material that is provided in some sort of group, social, community or other setting. Examples of such shared content might include materials shared within a family, trade organization, business, charity, hobby group, or other social network.

The third party content might include professional content. The professional content could include content-for-hire or content created by a publisher. There could be some overlap between shared and professional content.

Whereas the product is a collection of user content and advertisements, an instance of a product is the final form of the product. For instance, if the product is a newsletter, the instance may be a digital image of the newsletter with customized advertising, or it may be a hardcopy of the newsletter with customized advertising. If the product is software, the instance might be an executable file containing customized advertisements.

Reference is now made of FIG. 2, which illustrates an exemplary method of advertising in printed products. This exemplary method may be performed by a publisher, promoter, company, individual, or other third party. The exemplary method will be described in connection with a publisher who has the ability to publish a variety of publications.

At block 210, one or more vendors register with the publisher. At the time of registration, the vendor does not necessarily know the publications in which its advertisements will be placed. That determination may be made later. Registrants may be added and deleted as desired.

At block 220, the publisher obtains advertising content from the selected vendors. The content may be updated as desired. The publisher may provide an interface (e.g., a GUI, a query, a web-site print profile, a text message) for contacting the vendors and receiving information about their advertising content.

The vendors are given options about how they want their advertisements to be displayed. By way of example, the following options may be offered: an option that allows a vendor to customize fulfillment (block 230), an option that allows a vendor to make promotional offers (block 240), and an option that allows a vendor to customize based on recipient-specific information (block 250).

The option to customize fulfillment (block 230) allows a vendor to specify how the advertisements will be displayed in a publication. If this option is selected, the vendor supplies certain criteria (block 260). The criteria might specify whether the advertisement should be displayed in color or black and white. For example, if an instance of the publication is sent to a recipient who might be interested in the vendor's advertisement, that advertisement will be displayed in color. If the recipient is likely not to be interested, the advertisement will be displayed in black and white.

The criteria might specify placement of an advertisement. If the recipient is likely to be interested in an advertisement, the advertisement is given a prominent location in the instance of the publication. If the recipient is less likely or unlikely to be interested, the advertisement is given a less prominent location, or not placed in the instance.

The vendor advertisements can also be customized by allowing a mix of regional and national content. For example an advertising campaign for a retirement planning service might include corporate branding and message but also have space for contact information about regional representatives. This can also apply to collaborative advertising and co-branding as well.

The option to make promotional offers to specific recipients (block 240) allows a vendor to track and analyze the effectiveness of specific advertisements. Customer-specific coupons might give bigger discounts to high-value subscribers. As an example, a digital camera memory card vendor may want to promote its newest line of high capacity memory card to those customers who print the largest number of photographs. If this option is selected, the vendor supplies appropriate criteria (block 270).

This option also allows for recipient tracking. customer-specific promotional codes. The customer-specific promotional codes allow the vendors to gauge the specific value of their advertising investment. With unique custom printed advertisements for each instance, it should be possible to determine response rates with a high degree of accuracy.

For example a unique coupon with a serial number may be created for each recipient, or different barcodes can be inserted in the different instances for the different recipients. The unique coupon or barcode would allow the vendor to know at the point of redemption exactly how the individual came to buy the product. Another way of tracking recipients is to provide a unique URL that can be used at a vendor's web site.

The option to customize based on recipient-specific information (block 250) allows a vendor to base advertising decisions on recipient-specific information. If this option is selected, the vendor supplies information that allows advertisements to be customized for things such as zip codes and profiles (block 280). When specifying zip codes, a first advertisement might be displayed for recipients in a first area code, a second advertisement might be displayed for recipients in a second area code, and so forth. In a flier, such use of zip codes would allow, for example, a vendor to target recipients who are close to its stores. In a newsletter or newspaper, such use of zip codes would allow vendors to effectively select stories of interest to a particular region of the world.

When specifying a profile, a distinction could be made between different types of recipients. For example, advertisements could be customized for recipients in different corporations, advertisements could be customized for recipients belonging to different social groups, etc.

Once collected, the vendor information can be used to identify products and customers (block 290). For example, vendors advertising in newsletters might only want to advertise in color newsletters or newsletters with more than 25 pages or more than 25,000 recipients. The specifics of the product instance might include explicit and implicit information about the customer demographics.

As part of this step, the customer may provide information about its product. The publisher may provide an interface (e.g., a GUI, a query, a web-site print profile, a text message) for receiving the information and for allowing the customer to configure the product. The information may include customer-provided content that should be included in the publication. The customer-provided content might include personal content, content in the public domain, etc. The information might also specify third party content that should be included in the publication. The publisher can gather this third party content, which might include professional content from publishers, shared content from social networks, etc.

Once a product has been identified, recipients are identified (block 292). For example, the customer can supply a subscriber list, mailing addresses, and additional information that the customer has about the recipients. Recipients may also opt in to a system where they provide more details about their preferences and background. For example, recipients could take a survey that could be use to identify their interests, background and demographics.

Once the product has been identified, additional assumptions can be made about the recipient information (block 294). For instance, assumptions can be based on product type or category. Consider the example of kiosk photofinishing in a theme park. The time of day and location could be used to advertise for specific restaurants, character appearances or other specific special offers. Also consider the example of a custom printed travel guide that includes specific dates for arrival and departure. Vendors could advertise in their guide only if they will be open for business between those dates.

At block 296, product instances are created. Advertisements in each product instance are customized to reflect a convergence of the vendor interest and the recipient information.

The convergence in a product instance can occur at multiple levels. That is, a product instance could be distributed to different recipients, whereby different advertisements in the instance are customized for the different recipients. For example, there might be a convergence of vendor interests and the implicit and explicit information in recipient product instances. Explicit information to be used in this convergence might include, for example, shipping information, product instance properties, user profiles and CRMs. Implicit information to be used in this convergence might include, for example, tags in the data headers of any associated files, recipient information available to the customer, and time and location of the product instance fulfillment. Vendor interests might include, for example, up-selling, side-selling, conversion, and maximizing efficiency of their advertising budgets. Explicit and implicit information in a product instance enable a powerful opportunity for vendors to market to recipients.

As part of this method, the customer and publisher might come to an agreement about matters such as layout of the content, customer and vendor review of the final product, pricing, etc. (block 298) Pricing, for example, for the customer may be based partly on the preferred level of advertising (what the customer/user pays). Pricing for each vendor may be based partly on the print quality of the ads. Although agreement over these matters is illustrated as occurring at the end of method, the timing is not so limited. These various matters can be addressed at different times in the method.

At block 299, the product instances are printed and delivered (e.g., mailed) to the recipients. The printing can be performed locally or remotely. As but one example, the printing can be performed by the print center illustrated in FIG. 5, which will be discussed below.

The method of FIG. 2 is not limited to any particular print product. Several examples are provided in Tables 1-5.

In the example of Table 1, a photographer uploads personal photographs to an on-line photo-sharing service, and the service generates a photo album containing prints of the personal photographs along with stock photographs, customized advertisements, and promotional codes. The advertisements reflect a convergence of the interests of the memory seller and family member information.

TABLE 1

| Customer | Consumer photographer |
| --- | --- |
| Customer Interests | The latest compatible accessories compatible with their digital camera |

TABLE 1-continued

| Customer | Consumer photographer |
|---|---|
| Customer Content | Personal digital photographs |
| Recipient | Customer's family members |
| Fulfiller | On-line photo-sharing service |
| Vendor | Seller of digital camera memory |
| Vendor Interests | Targeting high-volume amateur photographers with compatible digital cameras with a given marketing budget and branding constraints |
| Advertising Instance | Compact flash card sales announcement with a unique URL on Vendor's web site |
| Professional content | Database of stock photographs from a commercial site |
| Product Instance | Photographic prints |

In the example of Table 2, a printing services company operates a photo-finishing kiosk at a theme park. A visitor gives camera memory to the kiosk, which accesses digital images from the memory and makes photographic prints of selected images. Customized advertisements and professional content could also be generated according to the number of pictures, camera model, and location of the kiosk. The customized advertisements and professional content could be provided as a banner or watermark on back of the prints, on covers for the photos, etc.

TABLE 2

| Customer | Consumer photographer |
|---|---|
| Customer Interests | Vacation keepsakes and souvenirs |
| Customer Content | Personal digital photographs |
| Recipient | Same as customer |
| Fulfiller | Print Services Company |
| Vendor | Theme Park |
| Vendor Interests | Promoting an upcoming movie |
| Advertising Instance | Schedule of movie character appearances for a given time period for specific locations such as restaurants, stores, resort locations and such |
| Professional content | Resort hotels reviewer |
| Product Instance | Photographic prints |

In the example of Table 3, a document services company generates instances of a newsletter for alumni of a university. Pictures in the newsletter could be on glossy or matte paper. Advertisements could be generated according to graduation year of an alumnus, alumni contributions, etc. The newsletter could contain university content, third-party content, contact information for a regional representative, etc.

TABLE 3

| Customer | University communications department |
|---|---|
| Customer Interests | Creation of high value targeted alumni outreach materials for fundraising and community building |
| Customer Content | General, class, departmental and other program materials |
| Recipients | Alumni |
| Fulfiller | Document Services Company |
| Vendor | Investment firm |
| Vendor Interests | Offering customized retirement planning services to professionals within a given age range with a range of regional marketing budgets |

TABLE 3-continued

| Customer | University communications department |
|---|---|
| Advertising Instance | Combination of national advertising material and regional service agents |
| Professional content | Magazine article featuring the university |
| Product Instance | Printed newsletter |

In the example of Table 4, a document services company generates an instance of an on-line custom travel guide for a traveler. As for content, advertisements may reflect duration or stay, trip dates and other traveler itinerary information. As for format, advertisements may be larger if the traveler's hotel is closer to the vendor, advertisements can exclude travelers only in town when restaurant closed, etc. Advertising may be considered as a component in pricing of the travel guide.

TABLE 4

| Customer | Traveler |
|---|---|
| Customer Interests | Trip planning for a specific set of locations at a given time period with a rough budget |
| Customer Content | Trip dates and locations. Possibly a hotel selected and other itinerary information. |
| Recipients | Same as customer |
| Fulfiller | On-line Document Service |
| Vendor | Restaurant in a city at one of the locations |
| Vendor Interests | Targeted advertising to tourists visiting the city and possibly staying in or near the city |
| Advertising Instance | Advertisement with complimentary desert |
| Professional content | Restaurant review of the restaurant |
| Product Instance | Printed travel guide |

In the example of Table 5, a customer sends her favorite personal and family recipes to a document service, and the document service generates cookbooks for the customer's relatives. Vendor ads may be placed more prominently in books with baking recipes, ads are not to be placed in cookbooks unrelated to baking, advertising is considered as a component in the pricing of each print, etc. The instances may be customized to the different interests of the different family members.

TABLE 5

| Customer | Consumer |
|---|---|
| Customer Interests | Creating a cookbook of favorite recipes |
| Customer Content | Personal and family recipes |
| Recipients | Consumer and other relatives |
| Fulfiller | On-line document service |
| Vendor | Dinnerware seller |
| Vendor Interests | Targeted advertising to bakers to promote new muffin pan |
| Advertising Instance | Coupon with local partner stores stocking the new muffin pan for customized cook books with muffin recipes |
| Professional content | Cook's Illustrated corresponding or complimentary recipes |
| Product Instance | Printed book |

The combination of block 292 (supplying recipient information such as mailing addresses) and block 299 (printing)

can help to discourage click fraud. Click fraud occurs because it is not always possible to differentiate legitimate user click-throughs from malicious click-throughs. Since block 292 requires delivery information about the recipients (so they can receive instances of their publications), the printing and delivery of the instances would also result in mail fraud, since large volumes of false mailings would be needed to defraud vendors.

A method according to the present invention is not limited to print publications. Other embodiments of a method according to the present invention could involve, without limitation, advertising in audio products and multimedia products.

Reference is made to FIG. 3, which illustrates an exemplary method of advertising in audio products. In this example, audio is streamed over the Internet, the recipient is a listener, and the fulfiller is an on-line media company.

At block 310, the listener uploads a personal play list to the media company. The listener could also access shared play lists online in the place of creating his or her own play list. The listener could also use a user interface to scan through current audio streams to find a starting point for their preferences.

At block 320, the media company uses the play list to make assumptions about interests of the listener. The media company could also request information from the listener. If the listener is a subscriber, the media company could use information on file to determine the listener's interests.

At block 330, the media company selects vendors that might be interested in advertising to the listener, and generates advertisements. The advertisements reflect a convergence of the vendor interest and the listener interests.

At block 340, the media might include other advertisements and information as well. For example, other advertisements and information might include promotions for local concerts and live events, promotions for movie releases, other songs by certain artists, artist interviews, news items, public service announcements, etc.

At block 350, songs on the play list and advertising content are streamed to the listener. For example, the vendor advertisements can be streamed, followed by the songs.

The audio product is not limited to music. For example, the audio product could provide political commentary or news. Advertisements for such a product might include advertisements for specific political books.

Reference is made to FIG. 4, which illustrates an exemplary method of advertising in multimedia products. In this example, the multimedia is displayed over a television, the customer/recipient is a person, and the fulfiller is a cable service provider.

At block 410, the cable provider receives a programming selection from the person (i.e., a channel is selected). At block 420, the cable provider selects advertisements based on the type of program selected. The advertisements may also be selected according to personal information on file about the person (e.g., viewing preferences, household income, hobbies, interests). The advertisements may also be selected according to other information (e.g., location, time of day).

At block 430, the cable provider can customize shared content. Shared content might include cast, crew and production interviews, production documentary's, amateur commentary such as satirical comments, user or community shared interface items such as pop-up bubbles, amateur scene reenactments, music videos, derived video sampling performance pieces or other content re-purposing.

At block 440, the cable provider offers personal preferences to the viewer. This step might allow a viewer to complete an optional user profile, configure play back options, and specify other preferences.

Block 440 also allows the viewer to specify advertising preferences. For example, the viewer can specify more or less advertising, advertising layout such as periodic full screen or constant banner, advertising characteristics such as fewer long advertisements versus a greater number of short advertisements, etc.

At block 450, program content and customized advertising content are transmitted to the television.

Yet another embodiment of a method according to the present invention could involve advertising in software products. Consider shareware. Advertisements in shareware could be customized prior to downloading the shareware to users. Thus, the customization can be performed in advance, rather than giving a user the option after the shareware has been downloaded.

Reference is now made to FIG. 5, which illustrates an exemplary print center 510 for performing a method according to an embodiment of the present invention. The exemplary print center 510 includes a plurality of printers 512 that are networked through one or more computers 514. The one or more computers 514 can be programmed to interface with customers and vendors, to gather vendor and recipient information, automatically gather product content and advertising content, and customize advertisements to reflect a convergence of recipient and vendor interests.

The one or more computers 514 may automatically generate publication instances. For example, the one or more computers 514 may insert the product content and customized advertisements into a template.

The one or more computers 514 may provide an interface for manual support. For instance, the host may also provide an editor interface for manual editing to the publications, means for performing manual searching, etc.

The exemplary print center 510 may be implemented at a single location or in a distributed manner. For example, a remote print center could be selected according to overall print traffic volume.

Although specific embodiments of the present invention have been described and illustrated, the present invention is not limited to the specific forms or arrangements of parts so described and illustrated. Instead, the present invention is construed according to the following claims.

The invention claimed is:

1. A method of advertising in instances of a product before the instances are distributed to different recipients, the method comprising:
   receiving information about the different recipients;
   receiving information about vendor interest with respect to advertising in the product, wherein the information about vendor interest includes advertisement criteria received from a plurality of vendors; and
   generating, by a computer, customized advertisements for each instance of the product, the customized advertisements in each instance reflecting a convergence of the vendor interest and the recipient information, the convergence occurring before the instance is created, wherein generating customized advertisements includes making a determination not to include, in the customized advertisements, an advertisement from at least one of the plurality of vendors in response to the advertisement criteria received from the plurality of vendors;
   whereby advertising in different instances is customized for the different recipients.

2. The method of claim 1, wherein the vendor interest includes how the advertisements will be displayed in the product.

3. The method of claim 1, wherein the vendor interest includes recipient tracking.

4. The method of claim 1, wherein the vendor interest is based on recipient specific information.

5. The method of claim 1, wherein the vendor interest is based on product type or category.

6. The method of claim 1, wherein the convergence occurs at multiple levels in a product instance.

7. The method of claim 1, further comprising creating the product instances from product content and the customized advertisements.

8. The method of claim 7, wherein at least some of the product content is provided by a customer.

9. The method of claim 7, wherein at least some of the product content is provided by a third party.

10. The method of claim 1, wherein receiving at least one of the recipient and vendor information includes performing contextual searches.

11. The method of claim 1, wherein the product is a print product, and wherein the method further comprises printing the product instances.

12. The method of claim 1, further comprising pricing the product according to the convergence of recipient and vendor interests.

13. An advertising method comprising:
   collecting vendor criteria about customized advertising in at least one product, wherein the vendor criteria include advertisement criteria received from a plurality of vendors;
   identifying a product in which vendor advertisements will be placed;
   obtaining information about people who will receive instances of the product; and
   selecting and customizing advertisements, by a computer, in each instance of the identified product, the customized advertisements in each instance reflecting a convergence of the vendor criteria and the recipient information, the convergence occurring before the instance is created, wherein selecting and customizing advertisements includes making a determination not to include, in the customized advertisements, an advertisement from at least one of the plurality of vendors in response to the advertisement criteria received from the plurality of vendors.

14. Apparatus for advertising in instances of a product, the method comprising:
   means for identifying recipients of the product before the instances are distributed to the recipients means for receiving information about the recipients;
   means for receiving information about vendor interest with respect to advertising in the product, wherein the information about vendor interest includes advertisement criteria received from a plurality of vendors; and
   generating, by a computer, customized advertisements for each instance of the product, the customized advertisements in each instance reflecting a convergence of the vendor interest and the recipient information, the convergence occurring before the instance is created, wherein the generation of customized advertisements includes making a determination not to include, in the customized advertisements, an advertisement from at least one of the plurality of vendors in response to the advertisement criteria received from the plurality of vendors.

15. A system comprising at least one computer for collecting vendor criteria about customized advertising in at least one product;
   identifying a product in which vendor advertisements will be placed and receiving advertisement criteria from a plurality of vendors;
   obtaining information about people who will receive instances of the product; and
   customizing the vendor advertisements in each instance of the identified product so that the customized advertisements in each instance reflect a convergence of the vendor criteria and the recipient information, the convergence occurring before the instance is created, wherein customizing the vendor advertisements includes making a determination not to include, in the customized advertisements, an advertisement from at least one of the plurality of vendors in response to the advertisement criteria received from the plurality of vendors.

16. The system of claim 15, wherein the computer also automatically assembles content product and vendor advertisements into the instances.

17. The system of claim 15, further comprising at least one printer for printing the product instances.

18. The system of claim 15, wherein the product is an audio product.

19. The system of claim 15, wherein the product is a multimedia product.

20. The system of claim 15, wherein the product is software.

* * * * *